United States Patent
Zhang et al.

(10) Patent No.: US 10,129,872 B2
(45) Date of Patent: Nov. 13, 2018

(54) MISDETECTION OF FRACTIONAL CHANNEL RESERVING SIGNALS

(71) Applicant: QUALCOMM Incorporated, San Diego, CA (US)

(72) Inventors: Xiaoxia Zhang, San Diego, CA (US); Tao Luo, San Diego, CA (US); Wei Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 14/968,462

(22) Filed: Dec. 14, 2015

(65) Prior Publication Data

US 2016/0174222 A1    Jun. 16, 2016

Related U.S. Application Data

(60) Provisional application No. 62/091,700, filed on Dec. 15, 2014.

(51) Int. Cl.
  *H04W 72/04* (2009.01)
  *H04W 74/08* (2009.01)
  *H04W 16/14* (2009.01)

(52) U.S. Cl.
  CPC ....... *H04W 72/0446* (2013.01); *H04W 74/08* (2013.01); *H04W 74/0816* (2013.01); *H04W 16/14* (2013.01)

(58) Field of Classification Search
  None
  See application file for complete search history.

(56) References Cited

U.S. PATENT DOCUMENTS

2014/0362780 A1    12/2014  Malladi et al.
2016/0135189 A1*   5/2016   Chandrasekhar ..........................
                                                    H04W 72/0453
                                                    370/329

(Continued)

OTHER PUBLICATIONS

International Search Report and Written Opinion—PCT/US2015/065812 ISA/EPO—dated Mar. 30, 2016.

(Continued)

*Primary Examiner* — Yaotang Wang
(74) *Attorney, Agent, or Firm* — Liem T. Do

(57) ABSTRACT

Managing misdetection of fractional channel reserving signals is discussed. Fractional channel reserving signals may be misdetected by receivers as regular channel reserving signals, thus, resulting in inconsistencies between transmitters and receivers in conducing uplink and downlink communication. Various aspects address solutions to this problem through different means, such as the transmitter using a different sequence for fraction channel reserving signals, ensuring that frame formatting signals are transmitted with the regular channel reserving signals, not transmitting such signals, or not transmitting regular channel reserving signals after the fractional signals are transmitted. Additionally, a transmitter may determine to discard one or more channel feedback reports from user equipment (UE) when such fractional signals are transmitted. Additional aspects would provide for the UE to monitor last and first subframes for the reserving signals to determine which signal, if any, is the fractional reserving signal.

18 Claims, 10 Drawing Sheets

(56) References Cited

U.S. PATENT DOCUMENTS

2016/0143014 A1* 5/2016 Mukherjee ........ H04W 74/0816
                                                        370/330
2017/0094681 A1* 3/2017 Takeda .................. H04W 16/14
2017/0230970 A1* 8/2017 Kim .................. H04W 72/0446

OTHER PUBLICATIONS

Qualcomm Incorporated: "Solutions for required functionalities and design targets", 3GPP Draft; R1-144000 Solutions for Required Functionalities and Design Targets, 3rd Generation Partnership Project (3GPP), Mobile Competence Centre ; 650, Route Des Lucioles ; F-06921 Sophia-Antipoli vol. RAN WG1, no. Ljubljana, Slovenia; Oct. 6, 2014-Oct. 10, 2014 Sep. 27, 2014 (Sep. 27, 2014), XP050869665, 5 pages Retrieved from the Internet: URL:http://www.3gpp.org/ftp/tsg_ran/WG1_RL1/TSGR178b/Docs/ [retrieved on Sep. 27, 2014].

* cited by examiner

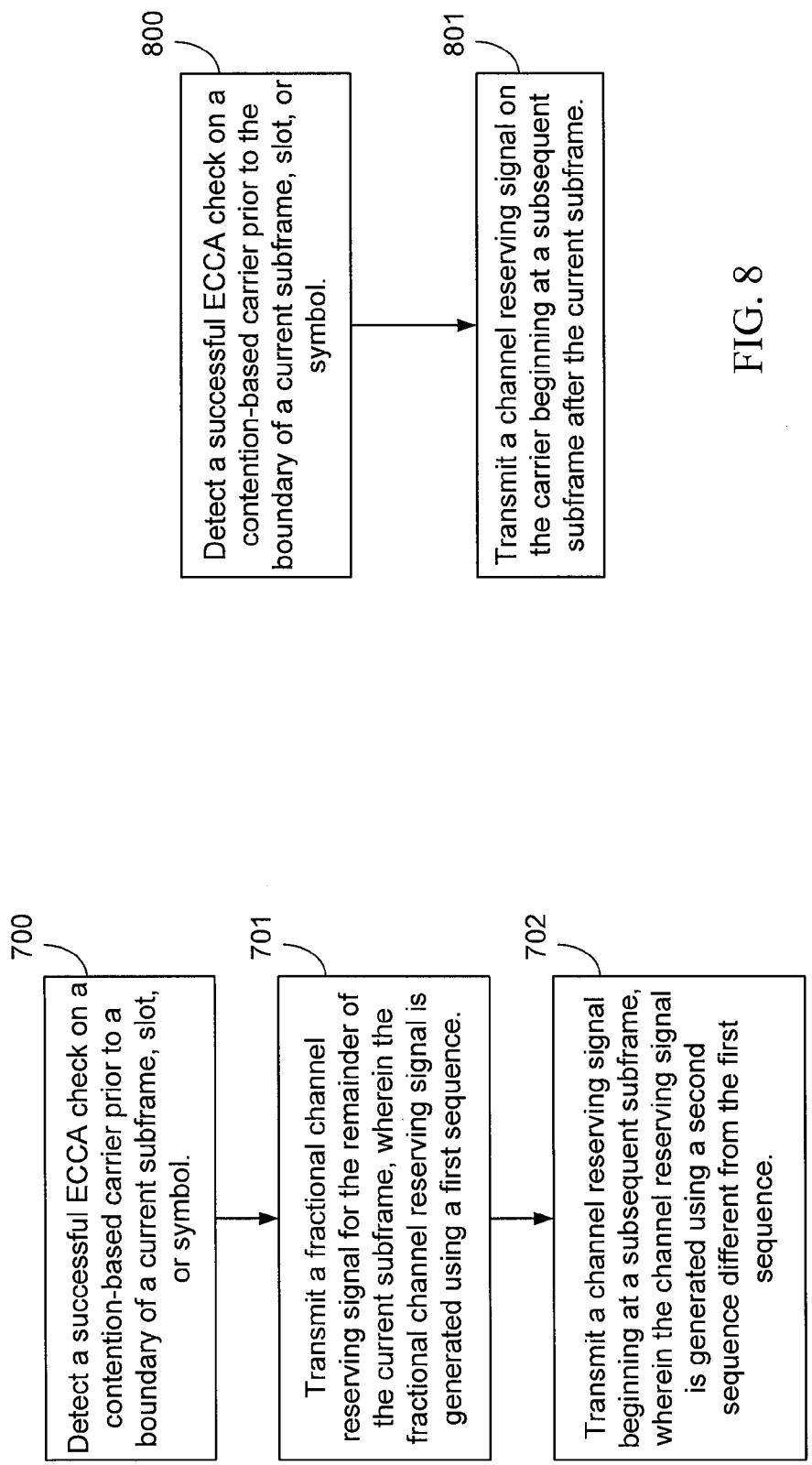

MISDETECTION OF FRACTIONAL CHANNEL RESERVING SIGNALS

CROSS-REFERENCE TO RELATED APPLICATIONS

This application claims the benefit of U.S. Provisional Patent Application No. 62/091,700, entitled, "MISDETECTION OF FRACTIONAL CHANNEL RESERVING SIGNALS," filed on Dec. 15, 2014, which is expressly incorporated by reference herein in its entirety.

BACKGROUND

Field

Aspects of the present disclosure relate generally to wireless communication systems, and more particularly, to misdetection of fractional channel reserving signals in systems with contention-based spectrum sharing including unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SCFDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes detecting, by a transmitter, a successful extended clear channel assessment (ECCA) check on at least one carrier utilizing a contention-based radio frequency spectrum, wherein the successful ECCA check occurs prior to a boundary of a current subframe, slot, or symbol, transmitting, by the transmitter, a fractional channel reserving signal between the successful ECCA check and the subframe boundary on the at least one carrier, wherein the fractional channel reserving signal is generated using a first sequence, and transmitting, by the transmitter, a channel reserving signal beginning at a subsequent subframe after the current subframe on the at least one carrier, wherein the channel reserving signal is generated using a second sequence different from the first sequence.

In an additional aspect of the disclosure, a method of wireless communication includes detecting, by a transmitter, a successful ECCA check on at least one carrier utilizing a contention-based radio frequency spectrum, wherein the successful ECCA check occurs prior to a boundary of a current subframe, slot, or symbol, and transmitting, by the transmitter, a channel reserving signal beginning at a subsequent subframe after the current subframe on the at least one carrier.

In an additional aspect of the disclosure, a method of wireless communication includes monitoring, by a UE, a first subframe for channel reserving signals, monitoring, by the UE, a subsequent subframe for channel reserving signals, and determining, by the UE, a first channel reserving signal detected in the first subframe is a fractional channel reserving subframe when the UE detects a subsequent channel reserving signal in the subsequent subframe.

In an additional aspect of the disclosure, a method of wireless communication includes detecting, by a transmitter, a successful ECCA check on at least one carrier utilizing a contention-based radio frequency spectrum, wherein the successful ECCA check occurs prior to a boundary of a current subframe, slot, or symbol, transmitting, by the transmitter, a fractional channel reserving signal between the successful ECCA check and the subframe boundary on the at least one carrier, and transmitting, by the transmitter, data beginning at a subsequent subframe after the current subframe on the at least one carrier.

In an additional aspect of the disclosure, a method of wireless communication includes detecting, by a transmitter, a successful ECCA check on at least one carrier utilizing a contention-based radio frequency spectrum, wherein the successful ECCA check occurs prior to a boundary of a current subframe, slot, or symbol, transmitting, by the transmitter, a fractional channel reserving signal between the successful ECCA check and the subframe boundary of the current subframe on the at least one carrier, transmitting, by the transmitter, a channel reserving signal beginning at a subsequent subframe after the current subframe on the at least one carrier, and transmitting, by the transmitter, a frame format indicator signal in addition to the channel reserving signal on the subsequent subframe.

In an additional aspect of the disclosure, a method of wireless communication includes detecting, by a transmitter, a successful ECCA check on at least one carrier utilizing a contention-based radio frequency spectrum, wherein the successful ECCA check occurs prior to a boundary of a current subframe, slot, or symbol, transmitting, by the transmitter, a fractional channel reserving signal between the successful ECCA check and the subframe boundary of the current subframe on the at least one carrier, and discarding, by the transmitter, each of one or more channel state information reports received by the transmitter in a subsequent subframe after the current subframe.

In an additional aspect of the disclosure, an apparatus configured for wireless communication includes means for detecting, by a transmitter, a successful ECCA check on at least one carrier utilizing a contention-based radio frequency spectrum, wherein the successful ECCA check occurs prior to a boundary of a current subframe, slot, or symbol, means for transmitting, by the transmitter, a fractional channel reserving signal between the successful ECCA check and the subframe boundary on the at least one carrier, wherein the fractional channel reserving signal is generated using a first sequence, and means for transmitting, by the transmitter, a channel reserving signal beginning at a subsequent subframe after the current subframe on the at least one carrier, wherein the channel reserving signal is generated using a second sequence different from the first sequence.

In an additional aspect of the disclosure, an apparatus configured for wireless communication includes means for detecting, by a transmitter, a successful ECCA check on at least one carrier utilizing a contention-based radio frequency spectrum, wherein the successful ECCA check occurs prior to a boundary of a current subframe, slot, or symbol, and means for transmitting, by the transmitter, a channel reserving signal beginning at a subsequent subframe after the current subframe on the at least one carrier.

In an additional aspect of the disclosure, an apparatus configured for wireless communication includes means for monitoring, by a UE, a first subframe for channel reserving signals, means for monitoring, by the UE, a subsequent subframe for channel reserving signals, and means for determining, by the UE, a first channel reserving signal detected in the first subframe is a fractional channel reserving subframe when the UE detects a subsequent channel reserving signal in the subsequent subframe.

In an additional aspect of the disclosure, an apparatus configured for wireless communication includes means for detecting, by a transmitter, a successful ECCA check on at least one carrier utilizing a contention-based radio frequency spectrum, wherein the successful ECCA check occurs prior to a boundary of a current subframe, slot, or symbol, means for transmitting, by the transmitter, a fractional channel reserving signal between the successful ECCA check and the subframe boundary on the at least one carrier, and means for transmitting, by the transmitter, data beginning at a subsequent subframe after the current subframe on the at least one carrier.

In an additional aspect of the disclosure, an apparatus configured for wireless communication includes means for detecting, by a transmitter, a successful ECCA check on at least one carrier utilizing a contention-based radio frequency spectrum, wherein the successful ECCA check occurs prior to a boundary of a current subframe, slot, or symbol, means for transmitting, by the transmitter, a fractional channel reserving signal between the successful ECCA check and the subframe boundary of the current subframe on the at least one carrier, means for transmitting, by the transmitter, a channel reserving signal beginning at a subsequent subframe after the current subframe on the at least one carrier, and means for transmitting, by the transmitter, a frame format indicator signal in addition to the channel reserving signal on the subsequent subframe.

In an additional aspect of the disclosure, an apparatus configured for wireless communication includes means for detecting, by a transmitter, a successful ECCA check on at least one carrier utilizing a contention-based radio frequency spectrum, wherein the successful ECCA check occurs prior to a boundary of a current subframe, slot, or symbol, means for transmitting, by the transmitter, a fractional channel reserving signal between the successful ECCA check and the subframe boundary of the current subframe on the at least one carrier, and means for discarding, by the transmitter, each of one or more channel state information reports received by the transmitter in a subsequent subframe after the current subframe.

In an additional aspect of the disclosure, a computer-readable medium having program code recorded thereon. This program code includes code to detect, by a transmitter, a successful ECCA check on at least one carrier utilizing a contention-based radio frequency spectrum, wherein the successful ECCA check occurs prior to a boundary of a current subframe, slot, or symbol, code to transmit, by the transmitter, a fractional channel reserving signal between the successful ECCA check and the subframe boundary on the at least one carrier, wherein the fractional channel reserving signal is generated using a first sequence, and code to transmit, by the transmitter, a channel reserving signal beginning at a subsequent subframe after the current subframe on the at least one carrier, wherein the channel reserving signal is generated using a second sequence different from the first sequence.

In an additional aspect of the disclosure, a computer-readable medium having program code recorded thereon. This program code includes code to detect, by a transmitter, a successful ECCA check on at least one carrier utilizing a contention-based radio frequency spectrum, wherein the successful ECCA check occurs prior to a boundary of a current subframe, slot, or symbol, and code to transmit, by the transmitter, a channel reserving signal beginning at a subsequent subframe after the current subframe on the at least one carrier.

In an additional aspect of the disclosure, a computer-readable medium having program code recorded thereon. This program code includes code to monitor, by a UE, a first subframe for channel reserving signals, code to monitor, by the UE, a subsequent subframe for channel reserving signals, and code to determine, by the UE, a first channel reserving signal detected in the first subframe is a fractional channel reserving subframe when the UE detects a subsequent channel reserving signal in the subsequent subframe.

In an additional aspect of the disclosure, a computer-readable medium having program code recorded thereon. This program code includes code to detect, by a transmitter, a successful ECCA check on at least one carrier utilizing a contention-based radio frequency spectrum, wherein the successful ECCA check occurs prior to a boundary of a current subframe, slot, or symbol, code to transmit, by the transmitter, a fractional channel reserving signal between the successful ECCA check and the subframe boundary on the at least one carrier, and code to transmit, by the transmitter, data beginning at a subsequent subframe after the current subframe on the at least one carrier.

In an additional aspect of the disclosure, a computer-readable medium having program code recorded thereon. This program code includes code to detect, by a transmitter, a successful ECCA check on at least one carrier utilizing a contention-based radio frequency spectrum, wherein the successful ECCA check occurs prior to a boundary of a current subframe, slot, or symbol, code to transmit, by the transmitter, a fractional channel reserving signal between the successful ECCA check and the subframe boundary of the current subframe on the at least one carrier, code to transmit, by the transmitter, a channel reserving signal beginning at a subsequent subframe after the current subframe on the at least one carrier, and code to transmit, by the transmitter, a frame format indicator signal in addition to the channel reserving signal on the subsequent subframe.

In an additional aspect of the disclosure, a computer-readable medium having program code recorded thereon. This program code includes code to detect, by a transmitter, a successful ECCA check on at least one carrier utilizing a contention-based radio frequency spectrum, wherein the successful ECCA check occurs prior to a boundary of a current subframe, slot, or symbol, code to transmit, by the transmitter, a fractional channel reserving signal between the successful ECCA check and the subframe boundary of the current subframe on the at least one carrier, and code to discard, by the transmitter, each of one or more channel state information reports received by the transmitter in a subsequent subframe after the current subframe.

In an additional aspect of the disclosure, an apparatus includes at least one processor and a memory coupled to the processor. The processor is configured to detect, by a transmitter, a successful ECCA check on at least one carrier utilizing a contention-based radio frequency spectrum, wherein the successful ECCA check occurs prior to a boundary of a current subframe, slot, or symbol, to transmit, by the transmitter, a fractional channel reserving signal between the successful ECCA check and the subframe boundary on the at least one carrier, wherein the fractional channel reserving signal is generated using a first sequence, and to transmit, by the transmitter, a channel reserving signal beginning at a subsequent subframe after the current subframe on the at least one carrier, wherein the channel reserving signal is generated using a second sequence different from the first sequence.

In an additional aspect of the disclosure, an apparatus includes at least one processor and a memory coupled to the processor. The processor is configured to detect, by a transmitter, a successful ECCA check on at least one carrier utilizing a contention-based radio frequency spectrum, wherein the successful ECCA check occurs prior to a boundary of a current subframe, slot, or symbol, and to transmit, by the transmitter, a channel reserving signal beginning at a subsequent subframe after the current subframe on the at least one carrier.

In an additional aspect of the disclosure, an apparatus includes at least one processor and a memory coupled to the processor. The processor is configured to monitor, by a UE, a first subframe for channel reserving signals, to monitor, by the UE, a subsequent subframe for channel reserving signals, and to determine, by the UE, a first channel reserving signal detected in the first subframe is a fractional channel reserving subframe when the UE detects a subsequent channel reserving signal in the subsequent subframe.

In an additional aspect of the disclosure, an apparatus includes at least one processor and a memory coupled to the processor. The processor is configured to detect, by a transmitter, a successful ECCA check on at least one carrier utilizing a contention-based radio frequency spectrum, wherein the successful ECCA check occurs prior to a boundary of a current subframe, slot, or symbol, to transmit, by the transmitter, a fractional channel reserving signal between the successful ECCA check and the subframe boundary on the at least one carrier, and to transmit, by the transmitter, data beginning at a subsequent subframe after the current subframe on the at least one carrier.

In an additional aspect of the disclosure, an apparatus includes at least one processor and a memory coupled to the processor. The processor is configured to detect, by a transmitter, a successful ECCA check on at least one carrier utilizing a contention-based radio frequency spectrum, wherein the successful ECCA check occurs prior to a boundary of a current subframe, slot, or symbol, to transmit, by the transmitter, a fractional channel reserving signal between the successful ECCA check and the subframe boundary of the current subframe on the at least one carrier, to transmit, by the transmitter, a channel reserving signal beginning at a subsequent subframe after the current subframe on the at least one carrier, and to transmit, by the transmitter, a frame format indicator signal in addition to the channel reserving signal on the subsequent subframe.

In an additional aspect of the disclosure, an apparatus includes at least one processor and a memory coupled to the processor. The processor is configured to detect, by a transmitter, a successful ECCA check on at least one carrier utilizing a contention-based radio frequency spectrum, wherein the successful ECCA check occurs prior to a boundary of a current subframe, slot, or symbol, to transmit, by the transmitter, a fractional channel reserving signal between the successful ECCA check and the subframe boundary of the current subframe on the at least one carrier, and to discard, by the transmitter, each of one or more channel state information reports received by the transmitter in a subsequent subframe after the current subframe.

BRIEF DESCRIPTION OF THE DRAWINGS

FIGS. 7-12 are block diagrams illustrating example blocks executed to implement various aspects of the present disclosure.

DETAILED DESCRIPTION

Figure 1:
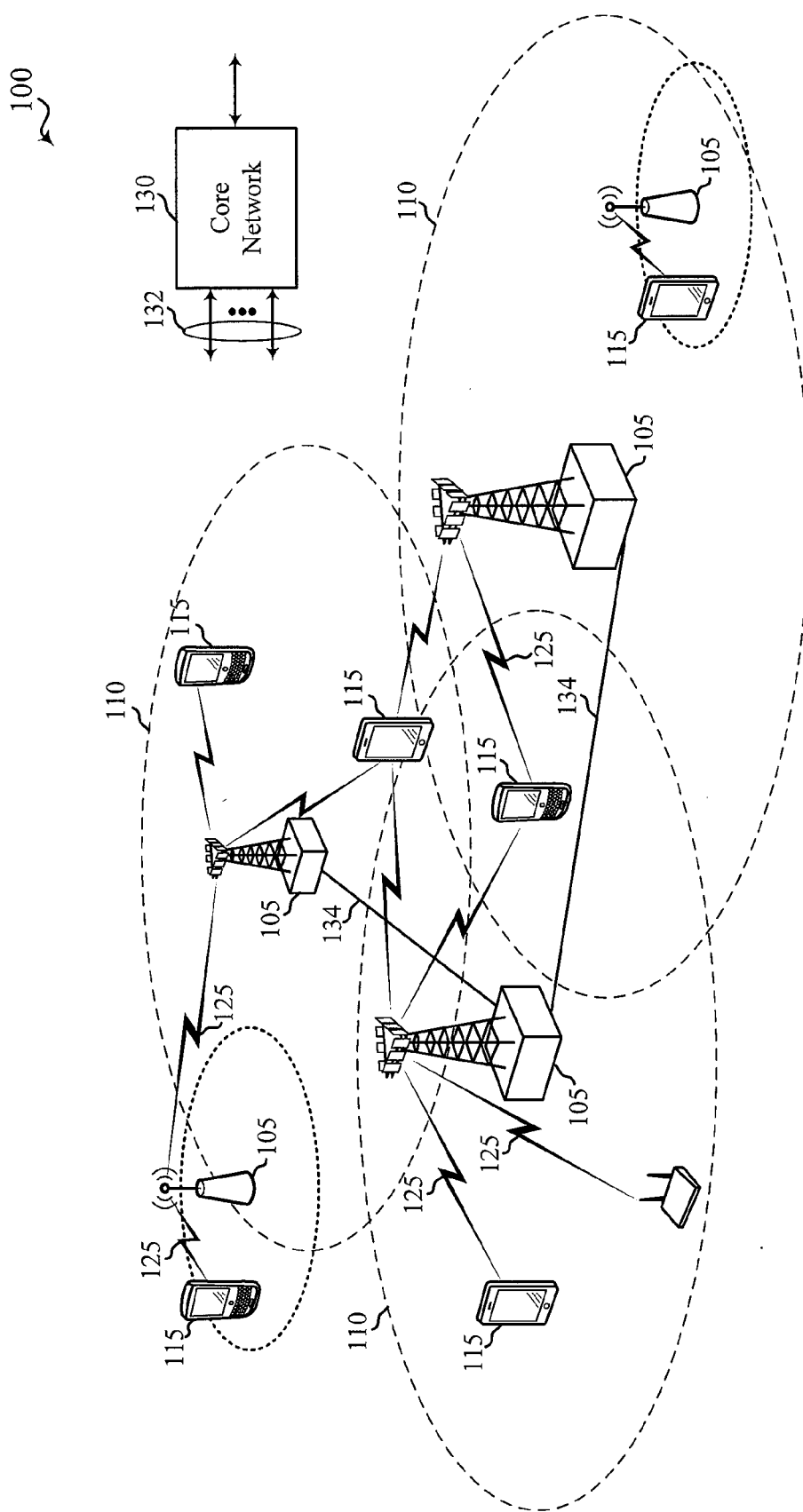
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-12.

Figure 2A:
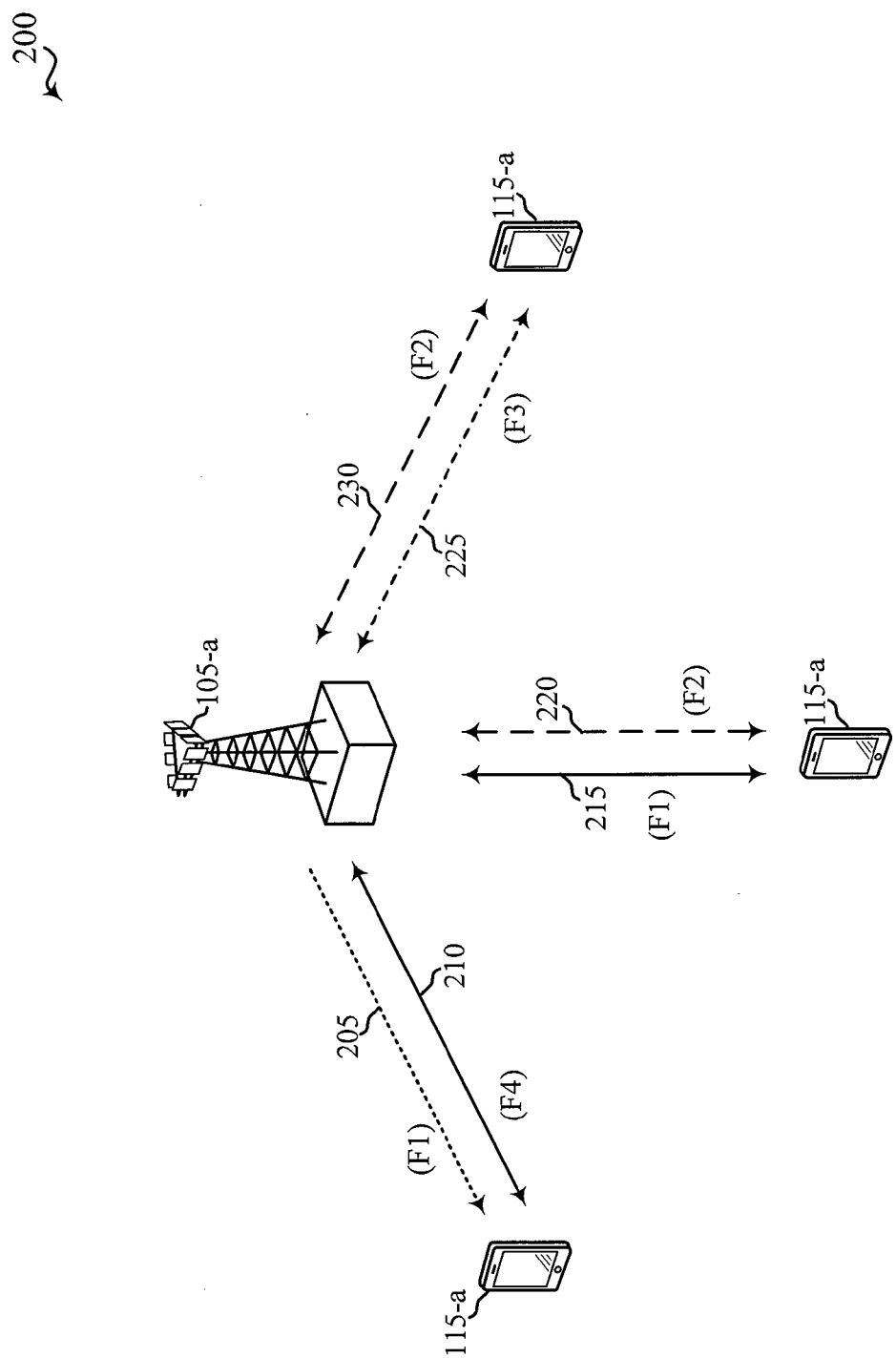
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
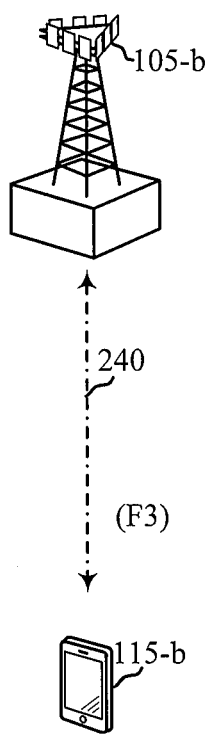
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
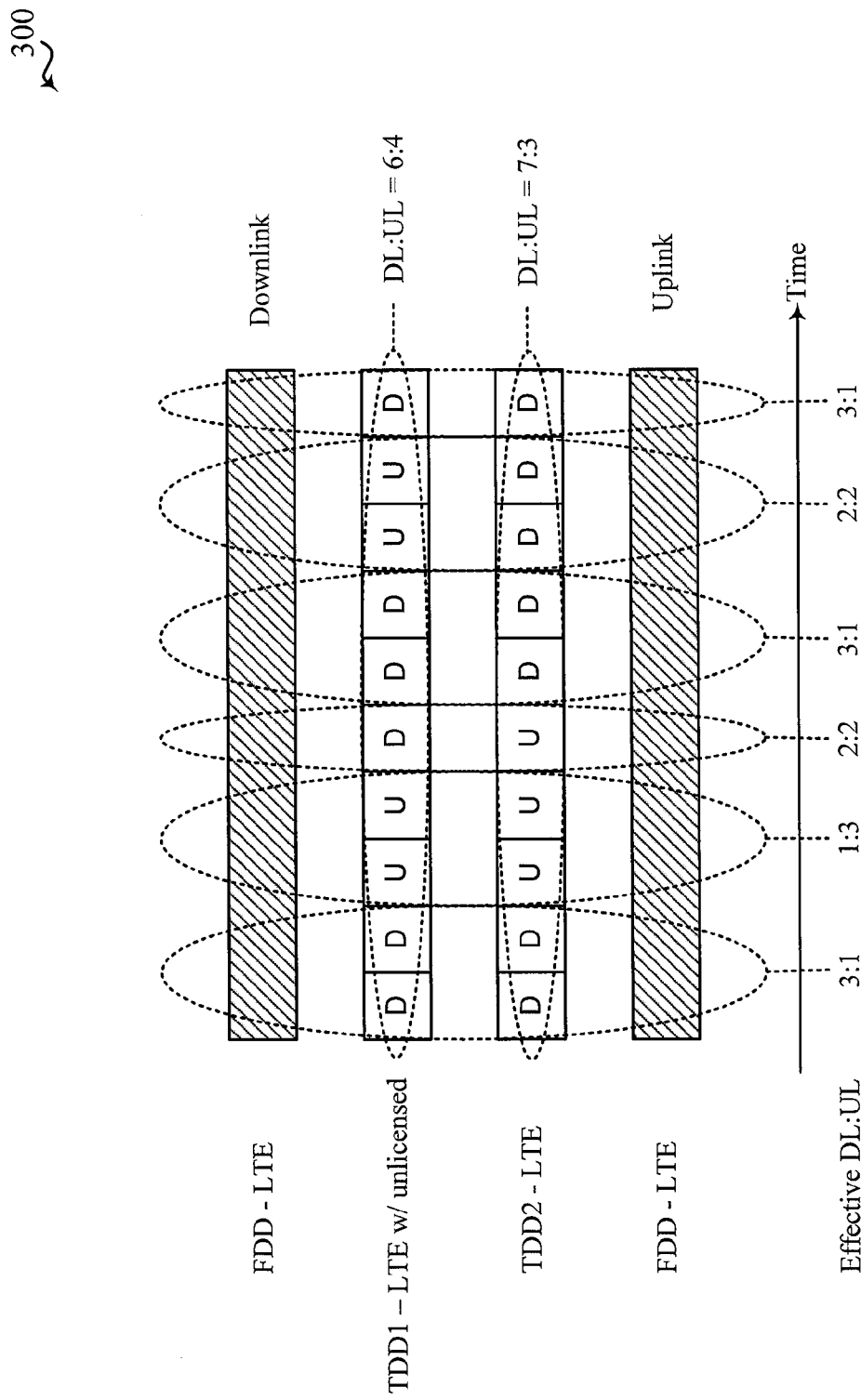
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
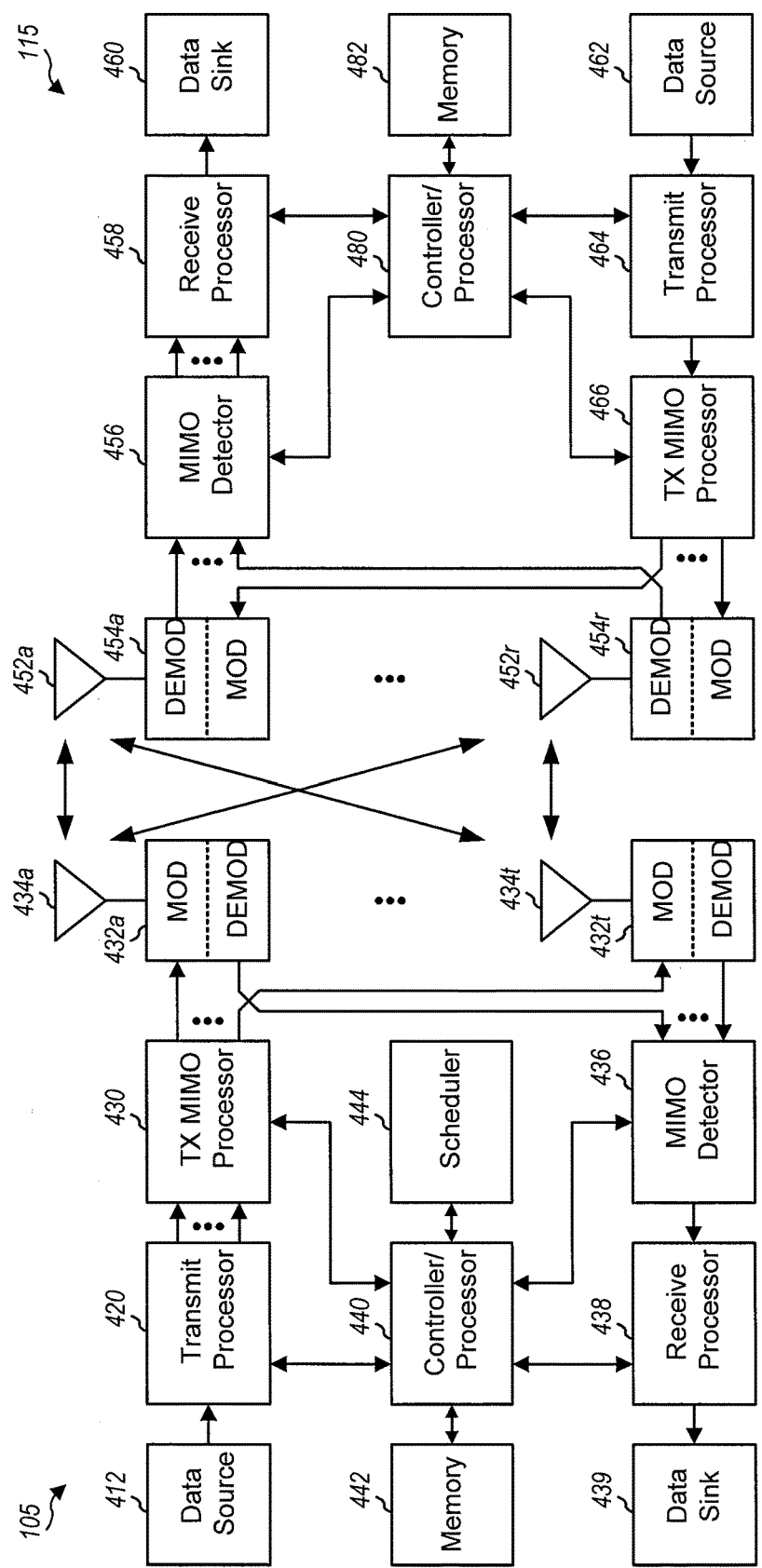
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 7-12, and/or other processes for the techniques described herein. The memories 442 and 482 may store data and program codes for the eNB 105 and the UE 115, respectively. A scheduler 444 may schedule UEs for data transmission on the downlink and/or uplink.

As previously noted, with increasing data traffic in cellular networks that use a licensed radio frequency spectrum band, offloading of at least some data traffic to contention-based radio frequency spectrum including unlicensed frequency bands may provide a cellular operator (e.g., an operator of a public land mobile network (PLMN) and/or a coordinated set of base stations defining a cellular network, such as an LTE/LTE-A network) with opportunities for enhanced data transmission capacity. Prior to gaining access to, and communicating over, the contention-based frequency spectrum band, a transmitting apparatus may, in some examples, perform an LBT procedure to gain access to the contention-based radio frequency spectrum band. As noted, such an LBT procedure may include performing a CCA procedure to determine whether a channel of the unlicensed radio frequency spectrum band is available. In additional examples, an extended CCA (ECCA) procedure that includes a multiple CCA procedures may be performed. When it is determined that a channel is available, the transmitting apparatus may communicate over a carrier that includes the available channel. The transmitting apparatus may also broadcast CUBS to indicate the usage of the available channel to other UEs and/or base stations.

The ECCA procedures are not necessarily synchronous with the underlying communication timing. Therefore, a transmitter may not detect a successful ECCA precisely at a subframe, slot, or symbol boundary. When a successful ECCA is detected in the middle of a particular subframe, slot, or symbol, the transmitter may immediately begin transmitting a channel reserving signal, such as CUBS, in the middle of the subframe, slot, or symbol in order to reserve the channel. This partial CUBS may be referred to as a fractional-CUBS (F-CUBS). However, when transmitting F-CUBS, a transmitter uses the same signaling sequence for the F-CUBS as for the regular CUBS transmitted in the following subframe, slot, or symbol. Because of this signal reuse, there may be non-negligible probability of a receiver detecting the F-CUBS and decoding it as a regular CUBS, which may cause undesirable behavior at the receiver. For example, the receiver, incorrectly identifying F-CUBS as CUBS would expect the subsequent subframe, slot, or symbol to contain data transmission. Moreover, for a UE receiver, the UE may attempt to decode an enhanced frame formatting indicator in the F-CUBS subframe, slot, or symbol. The frame formatting indicator may be signaled in an enhanced frame formatting indicator channel (EFFICH) or it can be signaled in any other downlink layer 1 channel. The enhanced frame format indicator is a frame configuration indicator that includes identification of the uplink and downlink subframe configuration in the following frame. Thus, a UE receiver may incorrectly determine uplink/downlink configuration for the entire transmission frame.

Figure 5:
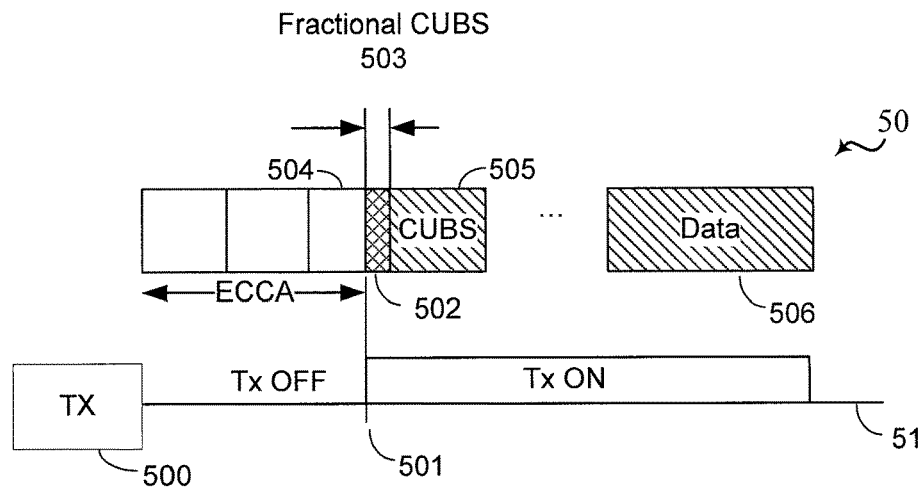
FIG. 5 is a block diagram illustrating a transmitter that transmits an F-CUBS.

FIG. 5 is a block diagram illustrating a transmitter 500 that transmits an F-CUBS 503. Transmitter 500 participates in the communications over transmission stream 50. Activity state graph 51 illustrates when transmitter 500 is on and off. During the ECCA process, transmitter 500 is off. However, at time 501, the ECCA is detected as successful and transmitter 500 begins transmitting F-CUBS 503. Time 501 falls within subframe 502 of transmission stream 50, which is in the middle of subframe 502. Thus, subframe 502 includes a muted or nulling period 504, when transmitter 500 is off and performing ECCA, and an active period, when transmitter 500 is on and transmitting F-CUBS 503. For example, transmitter 500 may be transmitting F-CUBS 503 for the remaining 67 μs of subframe 502. Thus, transmitter 500 transmits F-CUBS 503 with 67 μs on subframe 503 and transmits a full 14 symbol CUBS on subframe 505. A receiver would have a very high probability in detecting CUBS in subframe 502 when transmitter 500 is actually transmitting F-CUBS 503. Depending on the time duration of F-CUBS 503, a UE receiver may decode the enhanced frame format indicator correctly or erroneously.

It should be noted that transmitter 500 may be a type of base station or access point preparing for downlink data transmissions or could be a UE preparing for uplink data transmissions. In such a contention-based system, the transmitting entity would first determine whether any particular contention-based carrier is free before reserving the carrier for its own transmissions.

Figure 6:
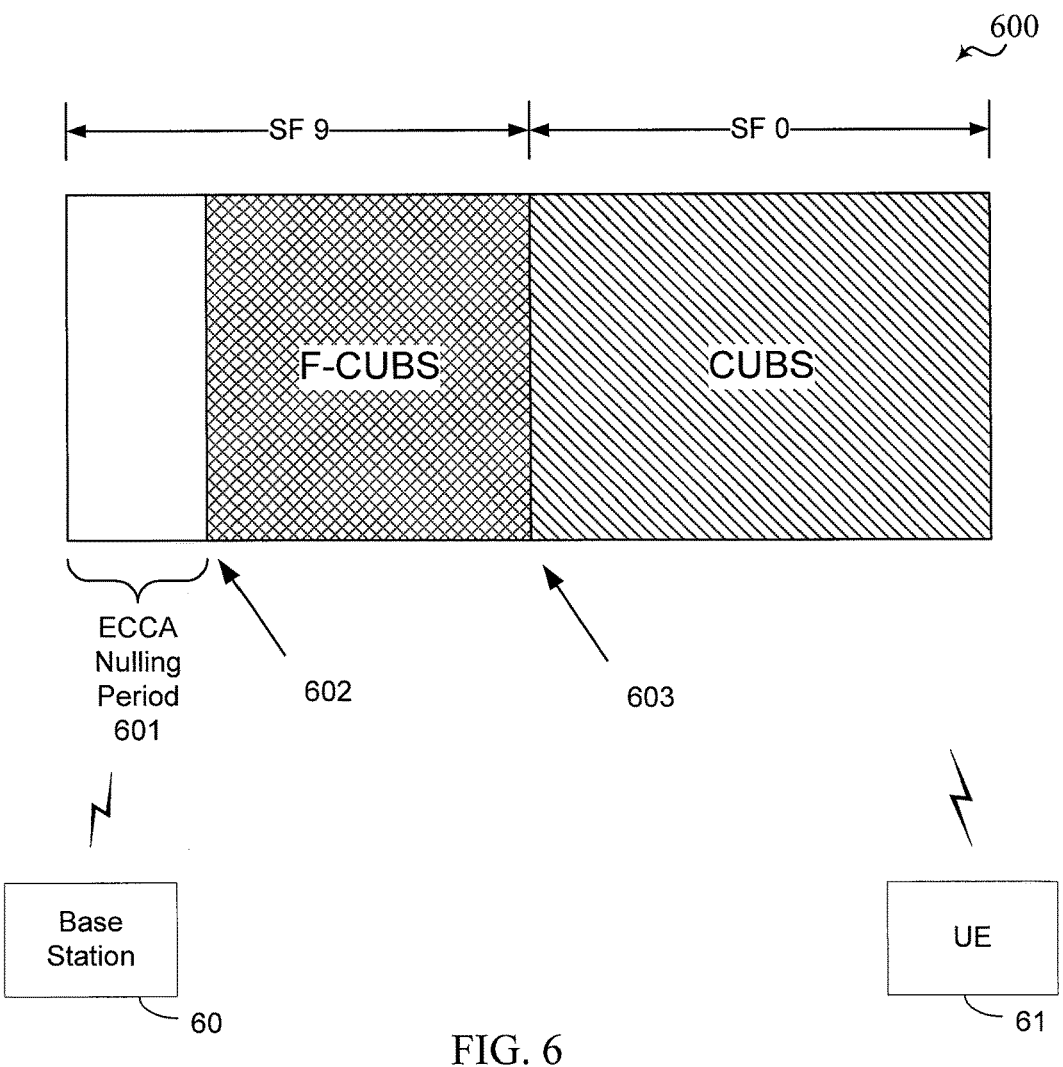
FIG. 6 is a block diagram illustrating a transmission stream including F-CUBs transmissions.

FIG. 6 is a block diagram illustrating transmission stream 600 including F-CUBs transmissions. Base station 60 and UE 61 participate in communications over transmission stream 600. In downlink transmissions, base station 60 performs an ECCA procedure and detects a successful ECCA at time 602 of subframe 9. During ECCA nulling period 601, the transmitters of base station 60 would be off. Base station 60 will then begin transmitting F-CUBS at time 602 to reserve the channel until subframe boundary 603 between subframe 9 and subframe 0. At subframe 0, base station 60 will begin transmitting CUBS. In the illustrated example, base station 60 is transmitting a regular CUBS on subframe 0. However, UE 61 may incorrectly determine that F-CUBS transmitted between time 602 and the subframe boundary 603 is a regular CUBS and, therefore, would expect an enhanced common reference signal (eCRS) and data to be transmitted on subframe 0. The false alarm on transmission of eCRS will impact CQI reporting from UE 61 to base station 60. False alarm on PDCCH transmission would also impact PDSCH detection and decoding performance at UE 61. Moreover, as previously mentioned, decoding errors on the enhanced frame format indicator will impact both downlink and uplink performance. For example, if UE 61 believes a subsequent subframe is an uplink subframe, when, in fact, it is scheduled as a downlink subframe, the uplink transmission may cause interference with the scheduled downlink transmissions or prevent base station 60 from having a successful CCA or ECCA for the downlink transmissions. Downlink transmissions may also cause interference to uplink transmissions in a similar manner when UE 61 incorrectly decodes EFFICH.

Figure 13:
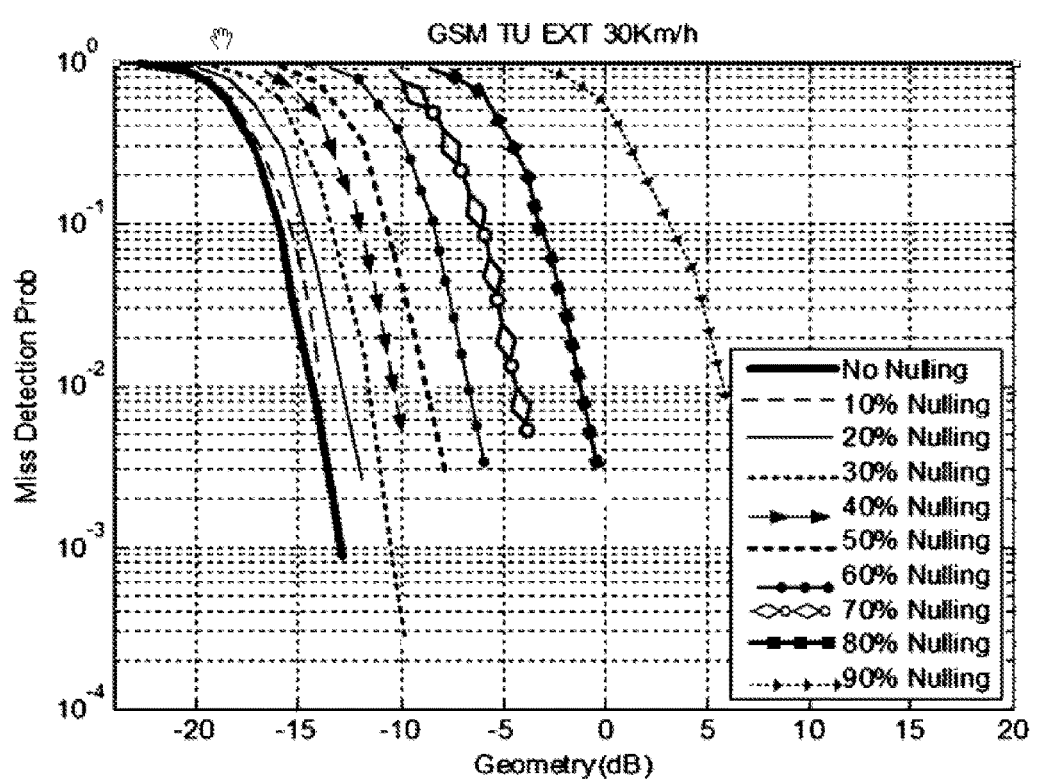
FIG. 13 shows a graph illustrating misdetection of F-CUBS signals over different nulling periods.

FIG. 13 represents a graph of misdetection of F-CUBS signals over different nulling periods. The nulling period (e.g., nulling period 504 (FIG. 5) and ECCA nulling period 601 (FIG. 6)) is the portion of the subframe in which the transmitter is off and performing the ECCA procedure. According to the graph of FIG. 13, non-trivial false alarm of incorrectly identifying a CUBS from a detected F-CUBS occurs even with only 10% CUBS energy (with 90% of the subframe in the nulling period). Because CUBS or F-CUBS generally occupies one out of N resource elements (REs) in a CUBS or F-CUBS transmission (e.g., N=3, 4, 5), the false alarm rate would not appreciably improve even if F-CUBS would be cyclically shifted in the time domain, for example, cyclically shifted up to a half-number of samples (e.g., 1024+M, where e.g., M=72). Because of the RE occupation in CUBS, the time domain in-phase/quadrature (I/Q) samples with CUBS and F-CUBS transmissions would have repetition. Such repetition may cause non-negligible peak energy in a given timing window even using a limited search window. Thus, false alarm CUBS detection may be observed even with a limited window search when a time-shifted CUBS is used for F-CUBS transmissions. Various aspects of the present disclosure are directed to reducing or eliminating the probability for misdetection of CUBS from F-CUBS transmissions.

FIG. 7 is a block diagram illustrating example blocks executed to implement one aspect of the present disclosure. At block 700, a transmitter detects a successful ECCA check on a contention-based carrier prior to the subframe, slot, or symbol boundary of a current subframe, slot, or symbol. As illustrated above, the ECCA is detected successful in the middle of the subframe, in which the transmitter is off during the ECCA process. The transmitter may identify the timing of the successful ECCA and compare this timing with the current subframe timing in order to detect the successful ECCA prior to the subframe boundary.

At block 701, the transmitter transmits a fractional channel reserving signal, such as an F-CUBS, for the remainder of the current subframe, wherein the fractional channel reserving signal is generated using a first sequence. CUBS transmissions are generated using known CUBS sequences. The CUBS sequence could be a function of cell ID, public land mobile number (PLMN) ID or both. In one operation example of block 701, a transmitter would generate the F-CUBS using a first sequence.

At block 702, the transmitter transmits a channel reserving signal beginning at the subsequent subframe, wherein the channel reserving signal is generated using a second sequence different from the first sequence. In such example operation, the transmitter generates the regular CUBS transmission using a different CUBS sequence than the F-CUBS transmission. Thus, a receiver entity in the example aspect may be able to distinguish the F-CUBS from the CUBS because each of the signals are generated using a different sequence.

In various aspects of the present disclosure, the second sequence may be a derived version of the first sequence. Deriving the second sequence from the first one reduces implementation complexity as the transmitter can derive the second sequence from the first one on the fly instead of generating and storing another sequence. For example, the F-CUBS may be a sequence that is derived as the reverse order of the CUBS sequence. Such a reverse order sequence may result in good cross-correlation with respect to the standard CUBS transmission.

In another example aspect, the F-CUBS may use a sequence that is derived as the reversed in-phase/quadrature (IQ) of the CUBS sequence, such that the F-CUBS will take quadrature components from CUBS and use them as in-phase components for F-CUBS while taking the in-phase components from CUBS and use them as quadrature components. In yet another example aspect, the F-CUBS may use a sequence that is derived as the product of the original CUBS sequence multiplied with another sequence where the other sequence can be easily implemented. For example, the other sequence can be a sequence with a random phase or a deterministic sequence such as "+ + − − + + − − . . . " which can be easily generated at runtime with limited complexity. In another example, with the deterministic sequence of "+ + − − + + − − . . . ", the transmitter would merely reverse the sign of IQ samples every other two samples.

Additionally, the sequence used to generate the F-CUBS may be completely different or orthogonal to the sequence used to generate the standard CUBS. The aspects of the present disclosure are not limited to any specific relationship between the different F-CUBS and CUBS sequences.

It should further be noted that, with regard to the aspect illustrated in FIG. 7, complexity may be added as a result of the different sequences. For example, the transmitter will now switch from idle state to F-CUBS with the first sequence, to CUBS transmission with a different sequence, and then to transmission of data.

FIG. 8 is a block diagram illustrating example blocks executed to implement an additional aspect of the present disclosure. At block 800, a transmitter detects a successful ECCA check on a contention-based carrier prior to the boundary of a current subframe, slot, or symbol. As illustrated above, the ECCA is detected successful in the middle of the subframe, in which the transmitter is off during the ECCA process.

At block 801, the transmitter transmits a channel reserving signal on the carrier beginning at the subsequent subframe. In the example aspect, the transmitter does not transmit an F-CUBS at all. Instead, the transmitter remains idle from the time in which the successful ECCA was detected in the middle of the previous subframe, slot, or symbol and the beginning of the next subframe. At the beginning of the next subframe, the transmitter will transmits a regular channel reserving signal, such as a CUBS transmission.

In additional implementations of the example aspect of FIG. 8, the transmitter may first perform a CCA check before transmitting the CUBS at the next subframe. Alternatively, the CCA check may only be performed when the idle period exceeds a particular predetermined threshold. In such aspects, the transmitter would compare the idle period against the threshold and only perform the CCA check if the threshold idle time is exceeded.

In the example aspect illustrated in FIG. 8, the transmitter may risk losing the channel by not immediately beginning to transmit the F-CUBS. However, the risk of a receiver misdetecting a CUBS from a received F-CUBS is eliminated by not transmitting an F-CUBS at all.

Figures 9, 10:
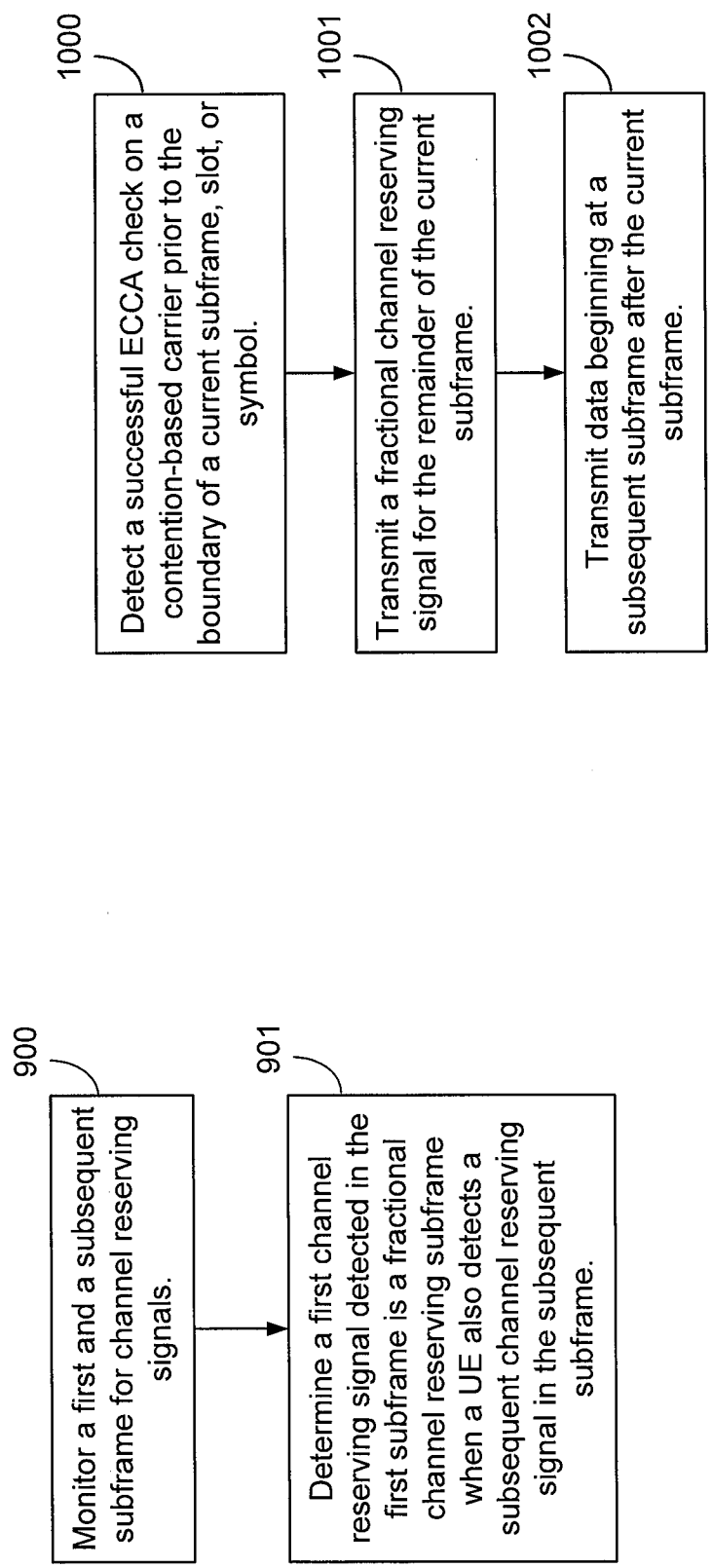

FIG. 9 is a block diagram illustrating example blocks executed to implement one aspect of the present disclosure. At block 900, a UE receiver monitors a first and subsequent subframe for channel reserving signals. For example, a UE may monitor for CUBS transmissions in a last symbol (e.g., symbol 13) of a last subframe (e.g., subframe 9) of a frame and in a first symbol (symbol 0) of a first subframe (e.g., subframe 0) of the subsequent frame.

At block 901, the UE determines that the first channel reserving signal detected in the first subframe is a fractional channel reserving subframe when the UE also detects a subsequent channel reserving signal in the subsequent subframe. Thus, for example, if the UE detects CUBS transmissions in both the last symbol of the subframe and the first symbol in the subsequent subframe, then it knows that the first CUBS transmission is actually an F-CUBS.

If the UE fails to detect a CUBS transmission in the subsequent subframe, the UE will instead determine that the first CUBS transmission detected in the first subframe is a standard CUBS transmission. Once the UE can determine which, if any, CUBS transmission is the F-CUBS and which CUBS transmission is a standard CUBS, the UE can properly identify when to expect the data or additional signaling, such as EFFICH, eCRS, PDCCH, and the like.

In additional implementations of the aspect illustrated in FIG. 9, the UE may be configured to perform parallel processing on the subsequent subframe for both CUBS and regular data transmissions. Thus, if the CUBS transmission detected in the first subframe turns out to be the standard CUBS, then the signals received by the UE in the subsequent subframe would likely include the regular data transmission. Therefore, the UE should process the signals in parallel or maintain the signals from the subsequent subframe in a buffer for processing.

FIG. 10 is a block diagram illustrating example blocks executed to implement one aspect of the present disclosure. At block 1000, a transmitter detects a successful ECCA check on a contention-based carrier prior to the boundary of a current subframe, slot, or symbol. As illustrated above, the ECCA is detected successful in the middle of the subframe, slot, or symbol, in which the transmitter is off during the ECCA process.

At block 1001, the transmitter transmits a fractional channel reserving signal, such as an F-CUBS, for the remainder of the current subframe. For example, the transmitter may transmit an F-CUBS for the remaining duration of the current subframe, between the time when the successful ECCA is detected and the subframe boundary.

At block 1002, the transmitter begins transmitting data at the subsequent subframe. In the example aspect illustrated in FIG. 10, the transmitter avoids the potential misdetection of CUBS from F-CUBS transmissions by skipping transmission of CUBS. The transmitter would reserve the contention-based carrier through the F-CUBS and begin regular data transmission in the next subframe.

In additional implementations of the example aspect illustrated in FIG. 10, the transmitter would transmit any additional signaling beginning in the subsequent subframe after the F-CUBS. For example, the transmitter would transmit EFFICH in the subsequent subframe in addition to the data transmissions. Thus, the receiving UE would be able to properly decode EFFICH to obtain the uplink/downlink subframe configuration. The UE may have a higher probability in missing the F-CUBS transmission compared to CUBS transmission, since the F-CUBS transmission will not be over the entire subframe. However, the probability may not greatly affect UE performance.

Figures 11, 12:
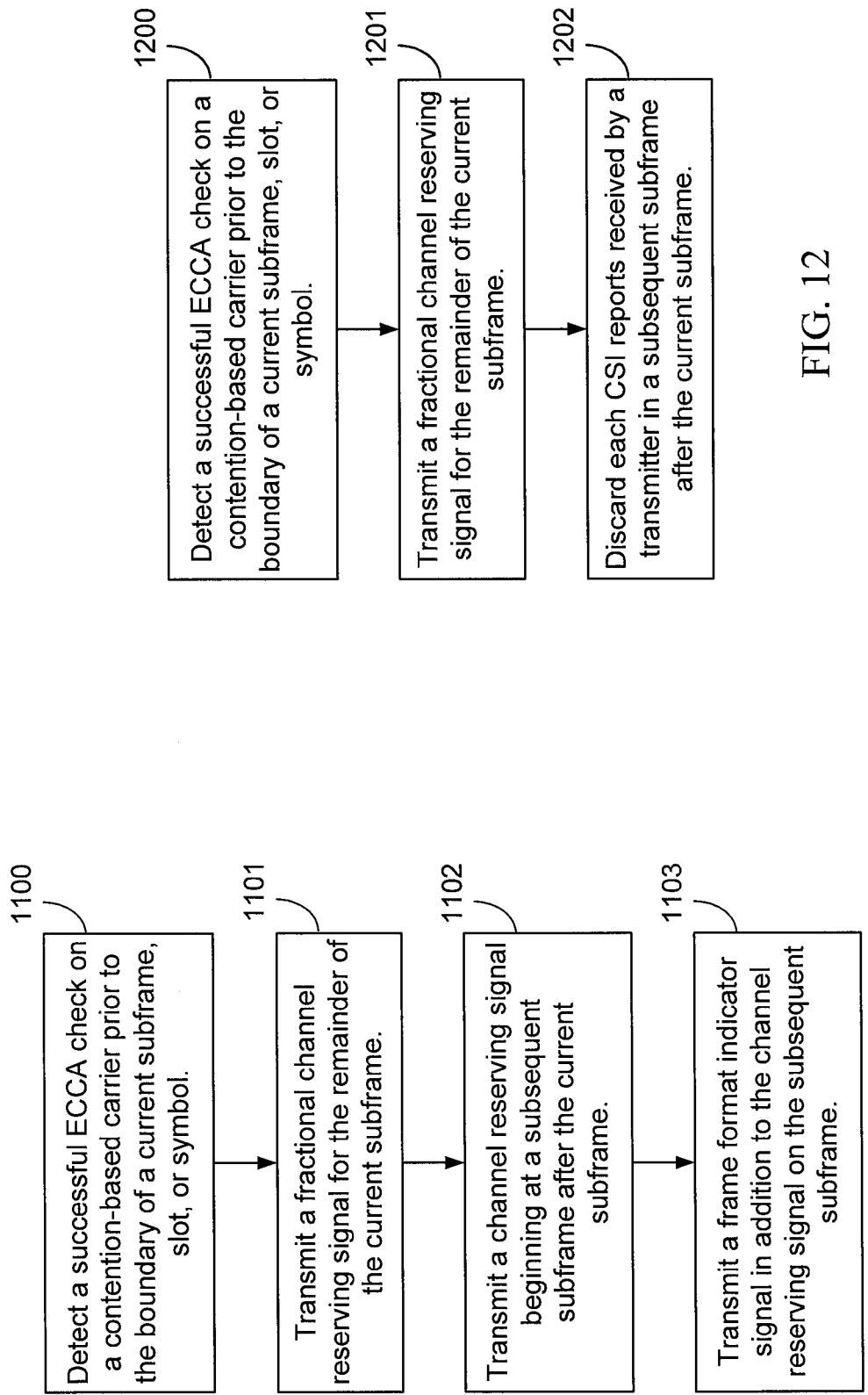

FIG. 11 is a block diagram illustrating example blocks executed to implement one aspect of the present disclosure. At block 1100, a transmitter detects a successful ECCA check on a contention-based carrier prior to the boundary of a current subframe, slot, or symbol. As illustrated above, the ECCA is detected successful in the middle of the subframe, in which the transmitter is off during the ECCA process.

At block 1101, the transmitter transmits a fractional channel reserving signal, such as an F-CUBS, for the remainder of the current subframe. For example, the transmitter may transmit an F-CUBS for the remaining duration of the current subframe, between the time when the successful ECCA is detected and the subframe boundary.

At block 1102, the transmitter transmits a channel reserving signal beginning at the subsequent subframe. For example, the transmitter may begin transmitting regular CUBS at the beginning of the next subframe.

At block 1103, the transmitter also transmits a frame format indicator along with the channel reserving signal in the subsequent subframe. For example, in addition to transmitting CUBS in the next subframe, the transmitter will also transmit a frame format indicator, such as EFFICH. In additional implementations, the transmitter may also transmit eCRS in the next subframe if the next subframe is scheduled for eCRS transmission.

FIG. 12 is a block diagram illustrating example blocks executed to implement one aspect of the present disclosure. At block 1200, a transmitter detects a successful ECCA check on a contention-based carrier prior to the boundary of a current subframe, slot, or symbol. As illustrated above, the ECCA is detected successful in the middle of the subframe, in which the transmitter is off during the ECCA process.

At block 1201, the transmitter transmits a fractional channel reserving signal, such as an F-CUBS, for the remainder of the current subframe. For example, the transmitter may transmit an F-CUBS for the remaining duration of the current subframe, between the time when the successful ECCA is detected and the subframe boundary.

At block 1202, the transmitter discards any CSI reports received from UEs by the transmitter in the subsequent subframe. In order to address the problem of unreliable CSI feedback with misdetection of CUBS from F-CUBS transmissions, the example aspect of FIG. 12 provides for the transmitter to simply disregard the CSI feedback that may be unreliable. In additional implementations, the transmitter may disregard all CSI feedback received from the UEs in the entire transmission frame after F-CUBS transmissions. In some instances, when the disregarded CSI report is for rank indication (RI) where the subsequent CSI reports are for PMI and CQI, which are based on the disregarded RI, the transmitter may disregard the RI and subsequent CQI/PMI until the next valid RI is reported.

It should be noted that the transmitters referred to in FIGS. 7, 8, and 10 may refer to transmitters that are either part of a base station or other access point preparing for downlink data transmissions or to UEs preparing for uplink data transmissions. Network entities that transmit data over contention-based frequency spectrum would perform LBT procedures that may include CCA, ECCA, and the like, which may benefit from the aspects of the present disclosure for reducing or eliminating misdetection of CUBS from F-CUBS transmissions.

It should further be noted that the transmitters and receivers forming any implementations of the aspects illustrated in FIGS. 7-12 may be a part of base stations and/or UEs, as appropriate, such as base stations 105 and UEs 115 of FIGS. 1, 2, 4, and base station 60 and UE 61 of FIG. 6. Each of the described blocks, functions, and features, may be implemented using the structure described for such base stations and UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7-12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C) or any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
detecting, by a transmitter, a successful extended clear channel assessment (ECCA) check on at least one carrier utilizing a contention-based radio frequency spectrum, wherein the successful ECCA check occurs prior to a boundary of one of: a subframe, slot, or symbol, of one of: a current subframe, a current slot, or a current symbol;
transmitting, by the transmitter, a fractional channel reserving signal between the successful ECCA check and the boundary of the one of a subframe, slot, or symbol of the one of the current subframe, the current slot, or the current symbol on the at least one carrier, wherein the fractional channel reserving signal is generated using a first sequence; and
transmitting, by the transmitter, a channel reserving signal beginning at a subsequent one of a subframe, slot, or symbol after the one of the current subframe, the current slot, or the current symbol on the at least one carrier, wherein the channel reserving signal is generated using a second sequence different from the first sequence.

2. The method of claim 1, further including:
detecting, by the transmitter, data for transmission on the at least one carrier;
generating, by the transmitter, the first sequence in response to the detecting the successful ECCA check;
generating, by the transmitter, the second sequence in response to reaching the boundary of the one of a subframe, slot, or symbol; and
transmitting, by the transmitter, the data after the subsequent one of a subframe, slot, or symbol.

3. The method of claim 1, further including:
detecting, by the transmitter, a time of the successful ECCA check;
comparing, by the transmitter, the time and a current timing of the one of the current subframe, the current slot, or the current symbol; and
determining, by the transmitter, that the time is prior to the boundary of the one of a subframe, slot, or symbol.

4. The method of claim 1, wherein the first sequence is a derived version of the second sequence.

5. The method of claim 4, wherein the derived version is one of:
a reversed order of the second sequence;
a reversed in-phase/quadrature order of the second sequence; or
the second sequence multiplied by another sequence.

6. A method of wireless communication, comprising:
detecting, by a transmitter, a successful extended clear channel assessment (ECCA) check on at least one carrier utilizing a contention-based radio frequency spectrum, wherein the successful ECCA check occurs prior to a boundary of a current subframe;
remaining idle from a time in which the successful ECCA check occurs and an end of the current subframe; and
transmitting, by the transmitter, a channel reserving signal beginning at a subsequent subframe after the current subframe on the at least one carrier.

7. The method of claim 6, further including:
performing, by the transmitter, a clear channel assessment (CCA) check prior to the transmitting the channel reserving signal at the subsequent subframe;
detecting, by the transmitter, results of the CCA check, wherein the transmitting occurs in response to a successful CCA check.

8. The method of claim 7, further including:
determining, by the transmitter, an idle time between the successful ECCA check and the boundary of the current subframe, wherein the performing the CCA check occurs in response to the idle time exceeding a predetermined threshold.

9. A non-transitory computer-readable medium having program code recorded thereon, the program code including:
program code for causing a computer to detect, by a transmitter, a successful extended clear channel assessment (ECCA) check on at least one carrier utilizing a contention-based radio frequency spectrum, wherein the successful ECCA check occurs prior to a boundary of one of: a current subframe, a current slot, or a current symbol;
program code for causing the computer to transmit, by the transmitter, a fractional channel reserving signal between the successful ECCA check and the boundary of the one of a subframe, slot, or symbol of the one of the current subframe, the current slot, or the current symbol on the at least one carrier, wherein the fractional channel reserving signal is generated using a first sequence; and
program code for causing the computer to transmit, by the transmitter, a channel reserving signal beginning at a subsequent one of a subframe, slot, or symbol after the one of the current subframe, the current slot, or the current symbol on the at least one carrier, wherein the channel reserving signal is generated using a second sequence different from the first sequence.

10. The non-transitory computer-readable medium of claim 9, further including:
program code for causing the computer to detect, by the transmitter, data for transmission on the at least one carrier;
program code for causing the computer to generate, by the transmitter, the first sequence in response to detecting the successful ECCA check;
program code for causing the computer to generate, by the transmitter, the second sequence in response to reaching the boundary of the one of a subframe, slot, or symbol; and
program code for causing the computer to transmit, by the transmitter, the data after the subsequent one of a subframe, slot, or symbol.

11. The non-transitory computer-readable medium of claim 9, further including:
   program code for causing the computer to detect, by the transmitter, a time of the successful ECCA check;
   program code for causing the computer to compare, by the transmitter, the time and a current subframe timing of the current subframe; and
   program code for causing the computer to determine, by the transmitter, that the time is prior to the boundary of the one of a subframe, slot, or symbol.

12. The non-transitory computer-readable medium of claim 9, wherein the first sequence is a derived version of the second sequence.

13. The non-transitory computer-readable medium of claim 12, wherein the derived version is one of:
   a reversed order of the second sequence;
   a reversed in-phase/quadrature order of the second sequence; or
   the second sequence multiplied by another sequence.

14. An apparatus configured for wireless communication, the apparatus comprising:
   at least one processor; and
   a memory coupled to the at least one processor,
   wherein the at least one processor is configured:
      to detect, by a transmitter, a successful extended clear channel assessment (ECCA) check on at least one carrier utilizing a contention-based radio frequency spectrum, wherein the successful ECCA check occurs prior to a boundary of one of: a current subframe, a current slot, or a current symbol;
      to transmit, by the transmitter, a fractional channel reserving signal between the successful ECCA check and the boundary of the one of a subframe, slot, or symbol of the one of the current subframe, the current slot, or the current symbol on the at least one carrier, wherein the fractional channel reserving signal is generated using a first sequence; and
      to transmit, by the transmitter, a channel reserving signal beginning at a subsequent one of a subframe, slot, or symbol after the one of the current subframe, the current slot, or the current symbol on the at least one carrier, wherein the channel reserving signal is generated using a second sequence different from the first sequence.

15. The apparatus of claim 14, further including configuration of the at least one processor:
   to detect, by the transmitter, data for transmission on the at least one carrier;
   to generate, by the transmitter, the first sequence in response to detecting the successful ECCA check;
   to generate, by the transmitter, the second sequence in response to reaching the boundary of the one of a subframe, slot, or symbol; and
   to transmit, by the transmitter, the data after the subsequent one of a subframe, slot, or symbol.

16. The apparatus of claim 14, further including configuration of the at least one processor:
   to detect, by the transmitter, a time of the successful ECCA check;
   to compare, by the transmitter, the time and a current subframe timing of the current subframe; and
   to determine, by the transmitter, that the time is prior to the boundary of the one of a subframe, slot, or symbol.

17. The apparatus of claim 14, wherein the first sequence is a derived version of the second sequence.

18. The apparatus of claim 17, wherein the derived version is one of:
   a reversed order of the second sequence;
   a reversed in-phase/quadrature order of the second sequence; or
   the second sequence multiplied by another sequence.

* * * * *